United States Patent
Block

(10) Patent No.: US 8,527,117 B2
(45) Date of Patent: Sep. 3, 2013

(54) AIRCRAFT HOVER SYSTEM AND METHOD

(75) Inventor: Gerald J. Block, Vista, CA (US)

(73) Assignee: Sandel Avionics, Inc., Vista, CA (US)

( * ) Notice: Subject to any disclaimer, the term of this patent is extended or adjusted under 35 U.S.C. 154(b) by 95 days.

(21) Appl. No.: 13/176,383

(22) Filed: Jul. 5, 2011

(65) Prior Publication Data

US 2012/0004793 A1 Jan. 5, 2012

Related U.S. Application Data

(60) Provisional application No. 61/360,959, filed on Jul. 2, 2010.

(51) Int. Cl.
*G05D 1/00* (2006.01)

(52) U.S. Cl.
USPC .................................. 701/9; 348/144; 701/3

(58) Field of Classification Search
USPC ........... 701/3, 14, 400, 467–470, 9; 244/1 R, 244/75.1; 340/945, 963–965, 970; 348/144
See application file for complete search history.

(56) References Cited

U.S. PATENT DOCUMENTS

| | | | |
|---|---|---|---|
| 6,341,248 B1 * | 1/2002 | Johnson | 701/4 |
| 7,970,507 B2 * | 6/2011 | Fregene et al. | 701/23 |
| 2008/0071431 A1 * | 3/2008 | Dockter et al. | 701/3 |
| 2010/0023189 A1 | 1/2010 | Suddreth et al. | |

FOREIGN PATENT DOCUMENTS

| | | |
|---|---|---|
| EP | 0945708 A2 | 9/1999 |
| EP | 2180457 A1 | 4/2010 |

* cited by examiner

*Primary Examiner* — Yonel Beaulieu
(74) *Attorney, Agent, or Firm* — Mayer & Williams PC; Mark D. Wieczorek

(57) ABSTRACT

An aircraft hover system for enabling an aircraft to hover at a target spatial location represented by GPS location coordinates. The hover system includes a display screen rendering a display including live video feed of the terrain below the airborne aircraft, a first mark overlaying the video feed, the first mark representing the current position of the aircraft relative to the terrain, and a perimeter surrounding the first mark, the portion of the terrain within the perimeter being substantially magnified compared to that of the terrain outside of the perimeter. The hover system is configured such that, as the aircraft approaches the target spatial location, the distance between the first mark and a second mark on the display gradually decreases until and finally the first and second marks coincide; the second mark representing the target spatial location.

20 Claims, 2 Drawing Sheets

AIRCRAFT HOVER SYSTEM AND METHOD

CROSS-REFERENCE TO RELATED APPLICATIONS

This application claims benefit of priority of U.S. Provisional Patent Application Ser. No. 61/360,959, filed Jul. 2, 2010, entitled "SYSTEM AND METHOD FOR HOVERING", owned by the assignee of the present application and herein incorporated by reference in its entirety.

FIELD

The present invention relates to Global Positioning Systems (GPS), Terrain Awareness Warning Systems (TAWS) employed in aircrafts, various indicator systems employed in an aircraft, and more particularly to an aircraft hover system for enabling the crew of an aircraft to hover the same at a target spatial location.

BACKGROUND

Vertical Take-Off and Landing (VOTL) Aircrafts deployed for firefighting operations, rescue operations, military operations, and the like, are at times required to hover at a particular strategic spatial location repeatedly. This is all the more true in the case of firefighting operations, as the aircrafts deployed therefore need to return to a particular spatial location more than once in order to carry out the assigned operation effectively. The terrain awareness systems and altimeters installed in the aircrafts help the crew thereof ascertain roughly as to where the target spatial location is located, however, a system solely dedicated to this purpose is yet to be known in the art.

SUMMARY

Systems and methods according to embodiments of the present invention provide for ways to enable an aircraft to hover at a target spatial location. The indicator system includes a display screen whereon a live video feed of the terrain below the airborne aircraft is rendered. The live video feed may include a camera view or may be a generated animation using terrain data and GPS data. Other types of video feeds will also be understood. The display further includes first and second marks representing the position of the airborne aircraft relative to the terrain and the target spatial location relative to the terrain respectively overlaid on the live video feed of the terrain. As the aircraft nears the target spatial location, the distance between the first and second marks decreases, e.g., gradually, and when the aircraft is at the target spatial location, the first and second marks substantially coincide, e.g., to within a predetermined tolerance, such as +/− zero to 10%, e.g., 3-5%. The target spatial location is registered into the aircraft hover system by entering the GPS location coordinates pertaining thereto into a user interface integral with the aircraft hover system.

In one aspect, the invention is directed to an aircraft hover system for enabling an aircraft to hover at a target spatial location represented by GPS location coordinates, the hover system including a display means rendering a display, including: (a) a live video feed of terrain below an airborne aircraft; (b) a first mark overlaying the video feed, the first mark representing a current position of the aircraft relative to the terrain; and (c) a perimeter surrounding the first mark, a portion of the terrain within the perimeter being magnified compared to that of the terrain outside of the perimeter. The system is configured such that, as the aircraft reaches a target spatial location, the distance between the first mark and a second mark on the display decreases until the first and second marks coincide to within a predetermined tolerance; the second mark representing the target spatial location.

Implementations of the invention may include one or more of the following. The display may further include an altitude indicator section displaying a current pointer representing the current altitude of the aircraft, and a target pointer representing a target altitude of the aircraft. The distance between the current and target pointers may be configured to decrease as the aircraft arrives at the target altitude from the current altitude.

The system may further include means for delivering an aural alert as the aircraft nears the target spatial location. The aural alert may include a success alert, the success alert being delivered when the first and second marks are coincident to within a predetermined tolerance. The aural alert may further include a stray alert, which is delivered when the aircraft, upon arriving at the target spatial location, strays therefrom, by an amount greater than a threshold. At any point, the visibility of the second mark on the display depends on the distance between the first and the second marks, the degree of the terrain magnification set, and the specifications of the display means. The display means may include a display screen. The first mark may be fixedly centrally disposed. The magnification of the terrain area outside of the perimeter may be adjustable. The system may further include an input for a global positioning system signal for receiving data for the live feed. The system may further include a user interface where a target spatial location including a set of GPS location coordinates are entered. The magnification of the terrain within the perimeter may be configured to increase as the aircraft approaches the target spatial location. The system may further include a marker means, such as a button, such that activation of the marker means at any spatial location causes the same to be entered as a target spatial location. Each of the first and second marks may include a crosshair. The perimeter may be rectangular. The aircraft may include a Vertical Take-Off and Landing (VTOL) aircraft, such as a helicopter.

In another implementation, the invention is directed to an aircraft hover system for enabling an aircraft to hover at a target spatial location represented by Global Positioning System (GPS) location coordinates, the hover system used in conjunction with a Terrain Awareness and Warning System, the hover system including a display screen rendering a display. The system may include: (a) a live video feed of the terrain below the airborne aircraft, the extent of the coverage of the live feed determined by a specification of a display means and a degree of magnification of the terrain, the live feed received from the GPS; (b) a centrally disposed first mark overlaying the video feed, the first mark representing the current position of the aircraft relative to the terrain, as determined by the GPS; and (c) a perimeter surrounding the first mark, the terrain within the perimeter, at any point, being magnified compared to the terrain outside of the perimeter; where the system is configured such that, as the aircraft approaches a target spatial location, the distance between the first mark and a second mark representing the target spatial location decreases until the first and second marks coincide to within a predetermined tolerance.

In a further implementation, the invention is directed toward a method of enabling an aircraft to hover at a target spatial location represented by location coordinates, including: receiving a live video feed of terrain below an airborne aircraft; displaying a first mark overlaying the video feed, the first mark representing a current position of the aircraft relative to the terrain; and displaying a perimeter surrounding the first mark, a portion of the terrain within the perimeter being substantially magnified compared to that of the terrain outside of the perimeter. As a distance between the aircraft and a target spatial location decreases, the live video feed is altered such that a distance between the first mark and a second mark on the display is caused to decrease until the first and second marks coincide to within a predetermined tolerance, the second mark representing the target spatial location.

The objects and advantages of the embodiments herein will become readily apparent from the following detailed description taken in conjunction with the accompanying drawings.

DETAILED DESCRIPTION

In the following detailed description, a reference is made to the accompanying drawings that form a part hereof, and in which the specific embodiments that may be practiced are shown by way of illustration. These embodiments are described in sufficient detail to enable those skilled in the art to practice the embodiments and it is to be understood that logical, mechanical and other changes may be made without departing from the scope of the embodiments. The following detailed description is therefore not to be taken in a limiting sense.

Systems and methods according to embodiments of the present invention provide ways to enable an aircraft to hover at a target spatial location represented by Global Position System (GPS) location coordinates. The aircraft hover system may be a stand-alone system or may be an extension of a Terrain Awareness Warning System (TAWS), which is typically coupled to GPS. The systems and methods may be particularly applicable to Vertical Take-Off and Landing (VOTL) aircraft, and even more particularly to helicopters deployed for rescue operations, military operations, firefighting operations, and the like, where, as discussed earlier, the aircraft is required to hover at particular spatial locations for strategic reasons.

Figure 1:
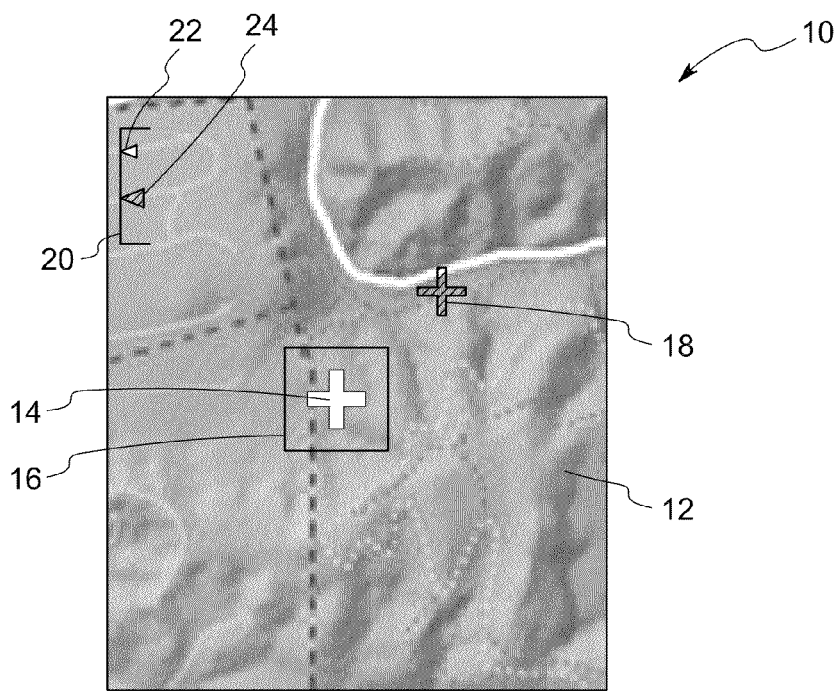
FIG. 1 is an illustration of a display of the aircraft hover system where the first and second marks are apart relative to the terrain.

The aircraft hover system may include a display screen of any suitable resolution and dimensions known in the art. In one embodiment, the display screen of the TAWS is used as the display means for the aircraft hover system so as to make more efficient use of the instrumentation already employed within an aircraft. Referring to FIG. 1, the display 10 rendered by the display screen includes a live video feed of the terrain 12 below the airborne aircraft. The aircraft hover system may be configured such that the live video feed of the terrain 12 can be magnified or reduced at any point upon the discretion of the aircraft crew. A centrally-disposed first mark 14 including, e.g., a crosshair, or the like, is overlaid on the video feed where the first mark 14 represents the current position of the airborne aircraft relative to the terrain 12. The aircraft hover system may be configured such that the first mark 14 is fixedly disposed whereas the live video feed of the terrain 12 is sensitive to the course of the aircraft. A perimeter 16, e.g., having a rectangular shape, surrounds the first mark 14 and may be such that the portion of the terrain 12 therewithin is at a higher level of magnification at any given point. As one of ordinary skill in the art can appreciate, the data, e.g., the live video feed and the relative position of the aircraft, may be received by GPS and passed on to the TAWS or other system.

The aircraft hover system may further include a user interface where the input details pertaining to the target spatial location are entered and received. More particularly, the user interface may include data-entry fields for entering or causing the entering (e.g., from another source) of GPS location coordinates pertaining to the target spatial location or locations. Another input option in the form of a marker key or button may be provided by the aircraft hover system. When the marker key or button is deployed at any spatial location, the same may be registered as a target spatial location, e.g., an auxiliary target. Once the details are entered, a second mark 18, representing the target spatial location, is associated with the live video feed of the terrain 12 as shown in FIG. 1. The second mark 18 may also be in the form of a crosshair or the like. The visibility of the second mark 18 on the display 10 depends on the distance between the current position of the aircraft and the target spatial location, the specifications or limitations of the display screen, and the set magnification of the terrain 12. The first and second marks 14 and 18 may be of different colors for easier identification. As the aircraft approaches the target spatial location, the second mark will be seen to, on a relative basis, approach the fixed first mark. When the aircraft is above the target spatial location, the marks may be substantially coincident, or at least coincident within a predetermined tolerance, such as 0 to 10%, 3 to 7%, 4-6%, or 5%. Other tolerances may also be employed depending on the situation.

Still referring to FIG. 1, the display 10 may also include an altitude section including an altitude scale 20, a current altitude pointer 22 pointing to the current altitude of the aircraft, and a target altitude pointer 24 pointing to the target altitude. Of all the various types of altitudes known in the art, e.g., radar, pressure, GPS, and the like, pressure altitude may be especially employed as the same generally avoids potential problems caused by gradients in uneven terrain. As one can appreciate, the current and target altitudes can be obtained from an altimeter, which is a general feature in any aircraft. In one embodiment, the details pertaining to the target altitude are entered into the user interface. The current and target altitude pointers 22 and 24 may be of different colors and sizes for easier identification.

Figure 2:
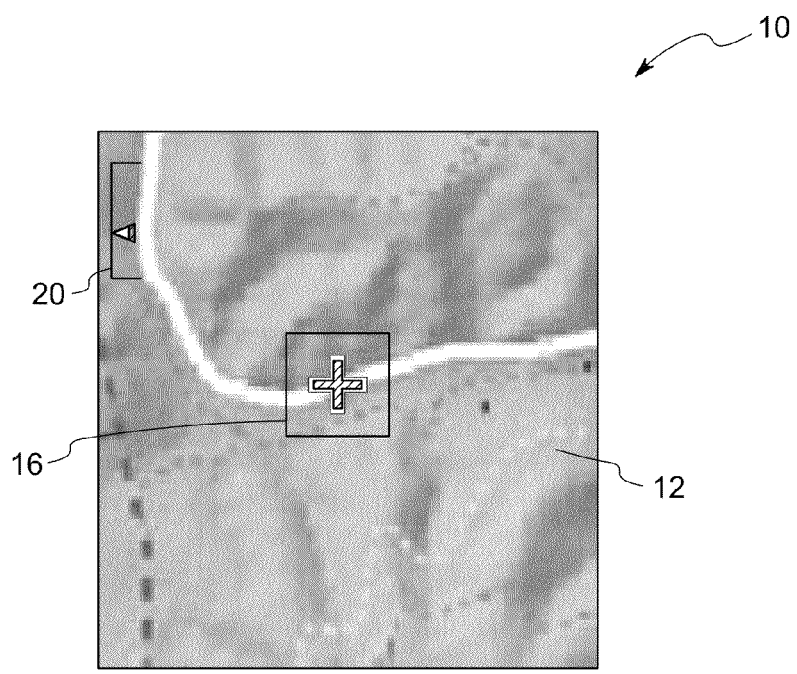
FIG. 2 is an illustration of the display of the aircraft hover system where the first and second marks are coincident relative to the terrain.

Referring to FIGS. 1 and 2, as the aircraft approaches the target spatial location, the distance between the first and second marks 14 and 18 gradually reduces until they finally coincide. Also, in a similar fashion, when the aircraft arrives at the target altitude from the current altitude, the distance between the current and target altitude pointers 22 and 24 is reduced and the pointers 22 and 24 finally coincide, and this may also be to within a predetermined tolerance, e.g., 0-10%, e.g., 3-7%, 4-6%, 5%, or the like. The degree of magnification within the perimeter 16 enables the pilot of the aircraft to make fine adjustments without him/her needing to magnify the terrain 12 at that point. In one embodiment, the aircraft hover system is configured such that the degree of magnification of the terrain 12 within the perimeter 16 gradually increases as the aircraft nears the target location.

The aircraft hover system may further include a means for delivering aural alerts to the crew of the aircraft at particular events. For example, an alert may be issued when the aircraft is at a predetermined distance from the target spatial location. In another example, an alert may be issued when the aircraft arrives at the target altitude. In yet another example, a stray alert may be issued when the aircraft, upon arriving at the target spatial location, strays from the same, e.g., by an amount greater than a threshold, e.g., greater than 1, 3, 5, 10%, depending on the level of accuracy needed. Other values will also be understood. Yet another alert may issue when the aircraft strays from the perimeter 16. As one of ordinary skill in the art can appreciate, these alerts may be delivered through a suitable hardware, such as a speaker, headphones, and the like.

Figure 3:
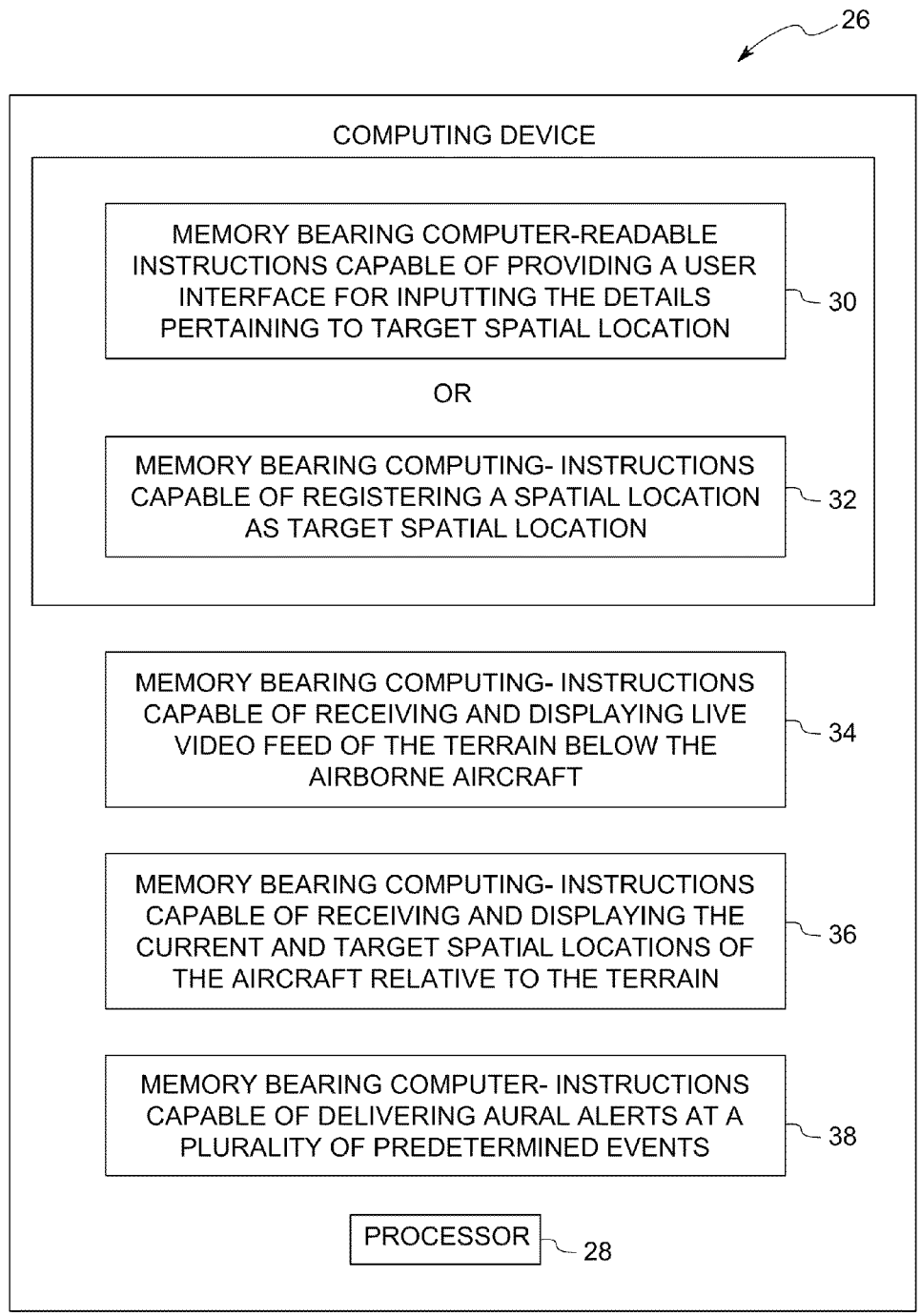
FIG. 3 is a depiction of an exemplary computing device that may constitute the aircraft hover system.

FIG. 3 illustrates another depiction of an exemplary computing device 26 that may constitute the aircraft hover system and perform the described method. The device 26 includes a processor 28 and a memory 30 bearing computer-readable instructions capable of providing a user interface for entering the details pertaining to the target spatial location where the details may include GPS location coordinates pertaining to the target spatial location. The details may optionally include details pertaining to a target altitude. The memory may accept such location or altitude data from a separate sensor, or the same may be entered manually by a user. As an alternative to the above discussed memory 30, the device 26 further includes memory 32 bearing computer-readable instructions capable of registering a spatial location as a target spatial location at any given point during the course of operation of the aircraft. In the similar fashion, the computer-readable instruction may also be capable of registering an altitude, at any given point, as a target altitude.

Still referring to FIG. 3, the device 26 may further include memory 34 bearing computer-readable instructions capable of receiving and displaying a live video feed of the terrain below the airborne aircraft. The device 26 may further include memory 36 bearing computer-readable instructions capable of receiving and displaying the current and target spatial locations of the aircraft relative to the terrain. The device 26 may further include memory 38 bearing computer-readable instructions capable of delivering aural alerts at a plurality of predetermined events. Other memories will also be understood to be possible for use in performing other steps noted in this specification.

The aircraft hover system may be fully implemented in any number of computing devices. Typically, instructions are laid out on computer readable media, generally non-transitory, and these instructions are sufficient to allow a processor in a computing device to implement the method of the aircraft hover system. The computer-readable medium may be a hard drive or solid state storage having instructions that, when run, are loaded into random access memory. Inputs to the aircraft hover system, e.g., from sensors or from users, may be by any number of appropriate computer input devices. For example, users may employ a keyboard, mouse, touch screen, joystick, track pad, or any other such computer input device to input data into the hover system. Sensors may include any sort of altimeter or any sort of navigational device. Data may also be inputted by way of an inserted memory chip, hard drive, flash drives, flash memory, optical media, magnetic media, or any other type of file storing medium.

The outputs may be delivered to a user by way of a video graphics card or integrated graphics chipset coupled to a display, e.g., on an avionics display. Alternatively, a printer may be employed to output hard copies of the results. For example, outputs may be stored on a memory chip, hard drive, flash drives, flash memory, optical media, magnetic media, or any other type of output device. It should also be noted that the invention may be implemented on any number of different types of computing devices, e.g., avionics devices, personal computers, laptop computers, notebook computers, net book computers, handheld computers, personal digital assistants, mobile phones, smart phones, tablet computers, and also on devices specifically designed for these purposes. In one implementation, a user of a smart phone or Wi-Fi-connected device may download a copy of the application to their device from a server using a wireless Internet connection. The application may download over the mobile connection, or over a Wi-Fi or other wireless network connection.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. An aircraft hover system for enabling an aircraft to hover at a target spatial location represented by GPS location coordinates, the hover system including a display means rendering a display, comprising:
   (a) a live video feed of terrain below an airborne aircraft;
   (b) a first mark overlaying the video feed, the first mark representing a current position of the aircraft relative to the terrain; and
   (c) a perimeter surrounding the first mark, a portion of the terrain within the perimeter being magnified compared to that of the terrain outside of the perimeter;
   wherein the system is configured such that, as the aircraft reaches a target spatial location, the distance between the first mark and a second mark on the display decreases until the first and second marks coincide to within a predetermined tolerance; the second mark representing the target spatial location.

2. The hover system of claim 1, wherein the display further comprises an altitude indicator section displaying a current pointer representing the current altitude of the aircraft, and a target pointer representing a target altitude of the aircraft; and such that the distance between the current and target pointers is configured to decrease as the aircraft arrives at the target altitude from the current altitude.

3. The hover system of claim 1, further comprising means for delivering an aural alert as the aircraft nears the target spatial location.

4. The hover system of claim 3, wherein the aural alert further includes a success alert, the success alert being delivered when the first and second marks are coincident to within a predetermined tolerance.

5. The hover system of claim 3, wherein the aural alert further includes a stray alert, which is delivered when the aircraft, upon arriving at the target spatial location, strays therefrom, by an amount greater than a threshold.

6. The hover system of claim 1, wherein at any point, the visibility of the second mark on the display depends on the distance between the first and the second marks, the degree of the terrain magnification set, and the specifications of the display means.

7. The hover system of claim 1, wherein the display means includes a display screen.

8. The hover system of claim 1, wherein the first mark is fixedly centrally disposed.

9. The hover system of claim 1, wherein the magnification of the terrain area outside of the perimeter is adjustable.

10. The hover system of claim 1, further comprising an input for a Global Positioning System signal for receiving data for the live feed.

11. The hover system of claim 1, further comprising a user interface wherein a target spatial location including a set of GPS location coordinates are entered.

12. The hover system of claim 1, wherein the magnification of the terrain within the perimeter is configured to increase as the aircraft approaches the target spatial location.

13. The hover system of claim 1, further comprising a marker means, such that activation of the marker means at any spatial location causes the same to be entered as a target spatial location.

14. The hover system of claim 13, wherein the marker means includes a button.

15. The hover system of claim 1, wherein each of the first and second marks include a crosshair.

16. The hover system of claim 1, wherein the perimeter is rectangular.

17. The hover system of claim 1, wherein the aircraft includes is a Vertical Take-Off and Landing (VTOL) aircraft.

18. The hover system of claim 17, wherein the VTOL aircraft is a helicopter.

19. An aircraft hover system for enabling an aircraft to hover at a target spatial location represented by Global Positioning System (GPS) location coordinates, the hover system used in conjunction with a Terrain Awareness and Warning System, the hover system including a display screen rendering a display, comprising:
   (a) a live video feed of the terrain below the airborne aircraft, the extent of the coverage of the live feed determined by a specification of a display means and a degree of magnification of the terrain, the live feed received from the GPS;
   (b) a centrally disposed first mark overlaying the video feed, the first mark representing the current position of the aircraft relative to the terrain, as determined by the GPS; and
   (c) a perimeter surrounding the first mark, the terrain within the perimeter, at any point, being magnified compared to the terrain outside of the perimeter;
   wherein the system is configured such that, as the aircraft approaches a target spatial location, the distance between the first mark and a second mark representing the target spatial location decreases until the first and second marks coincide to within a predetermined tolerance.

20. A method of enabling an aircraft to hover at a target spatial location represented by location coordinates, comprising:
   a. receiving a live video feed of terrain below an airborne aircraft;
   b. displaying a first mark overlaying the video feed, the first mark representing a current position of the aircraft relative to the terrain; and
   c. displaying a perimeter surrounding the first mark, a portion of the terrain within the perimeter being substantially magnified compared to that of the terrain outside of the perimeter;
   d. as a distance between the aircraft and a target spatial location decreases, altering the live video feed such that a distance between the first mark and a second mark on the display is caused to decrease until the first and second marks coincide to within a predetermined tolerance, the second mark representing the target spatial location.

* * * * *